United States Patent [19]

Eggers

[11] 4,376,997
[45] Mar. 15, 1983

[54] SPINDLE ASSEMBLY

[75] Inventor: Frederick S. Eggers, San Jose, Calif.

[73] Assignee: Pro Quip, Inc., Santa Clara, Calif.

[21] Appl. No.: 246,678

[22] Filed: Mar. 23, 1981

[51] Int. Cl.³ .................... G01D 15/28; G11B 17/02; G11B 3/62
[52] U.S. Cl. .................................... 369/270; 360/98; 360/99; 346/137
[58] Field of Search .................. 369/58, 270, 271; 360/97, 98, 99; 346/137

[56] References Cited

U.S. PATENT DOCUMENTS

| | | | |
|---|---|---|---|
| 3,345,074 | 10/1967 | Estkowski | 369/270 |
| 3,608,909 | 9/1971 | Rabinow | 369/270 |
| 3,670,315 | 6/1972 | Fowler | 360/97 |
| 3,867,724 | 2/1975 | Bruer et al. | 369/270 |

Primary Examiner—Steven L. Stephan
Attorney, Agent, or Firm—Flehr, Hohbach, Test, Albritton & Herbert

[57] ABSTRACT

A spindle assembly of a type adapted to receive a readily removable disc for rotation senses the thickness of the disc with respect to a predetermined thickness and in response to so sensing the thickness of the disc an indication is provided as to whether the thickness of the disc varies from the predetermined thickness. The disc is clamped by movement of a clamping body while a portion of the spindle assembly serves to insure that the clamping body moves into and out of engagement with the disc surface in a direction substantially normal to the disc under control of the spindle assembly. In addition, the force with which the clamping body acts is modulated selectively as desired to accommodate the need for greater forces when mounting larger discs.

10 Claims, 10 Drawing Figures

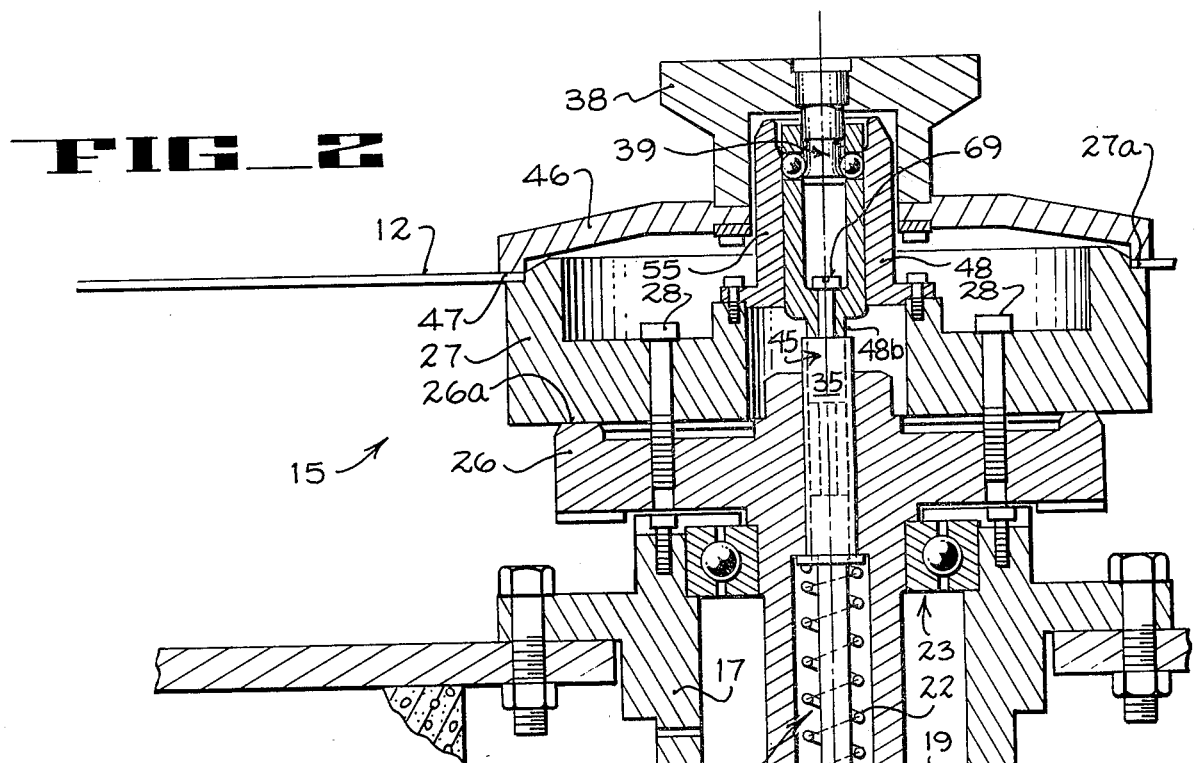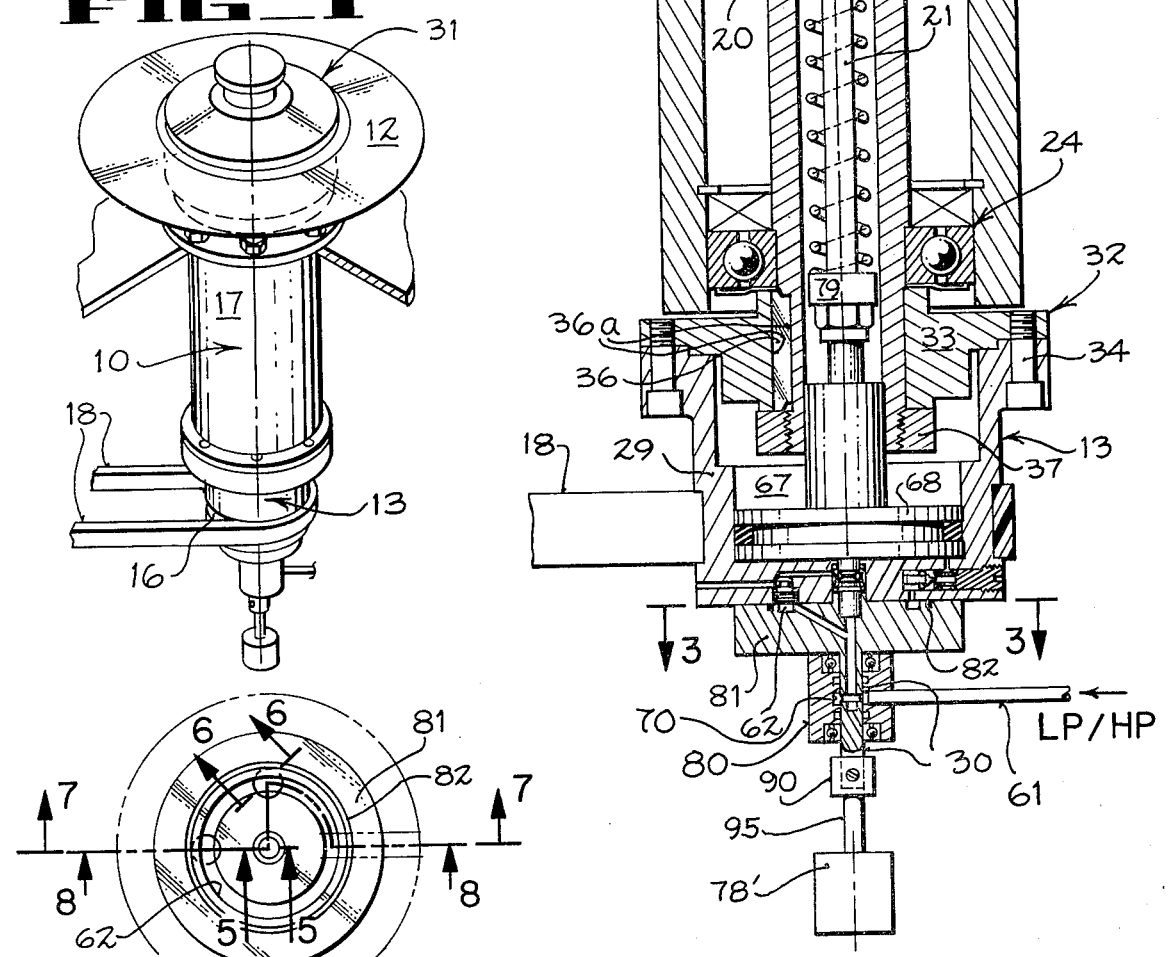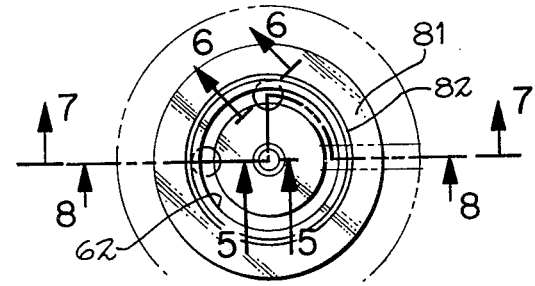

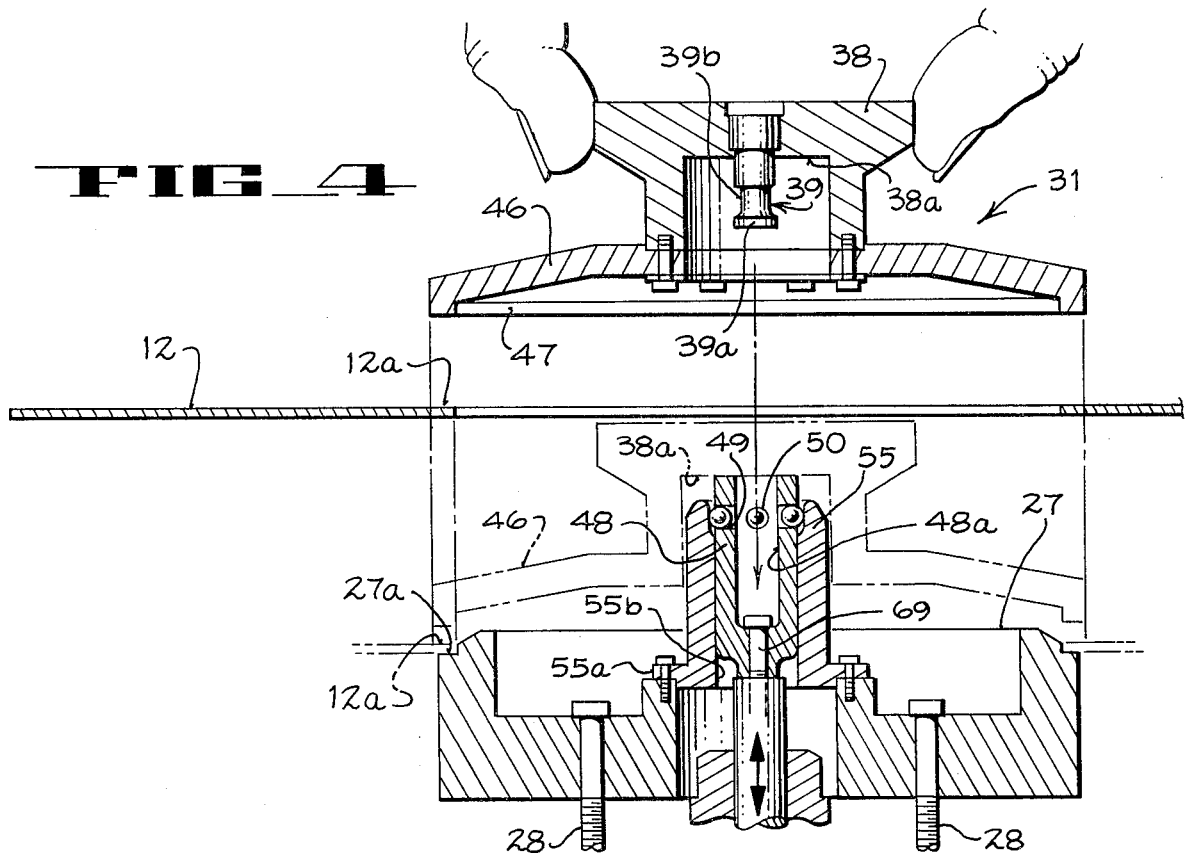
FIG_4
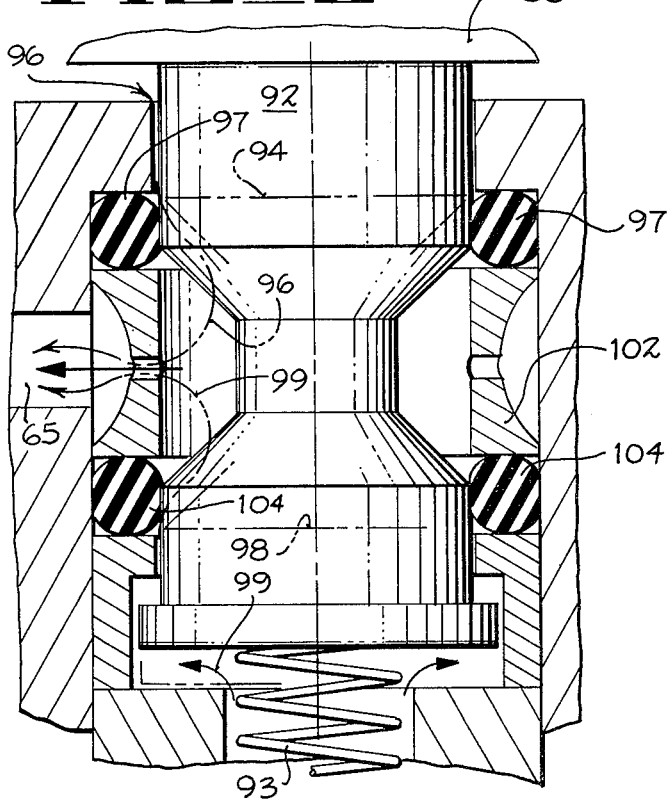
FIG_5
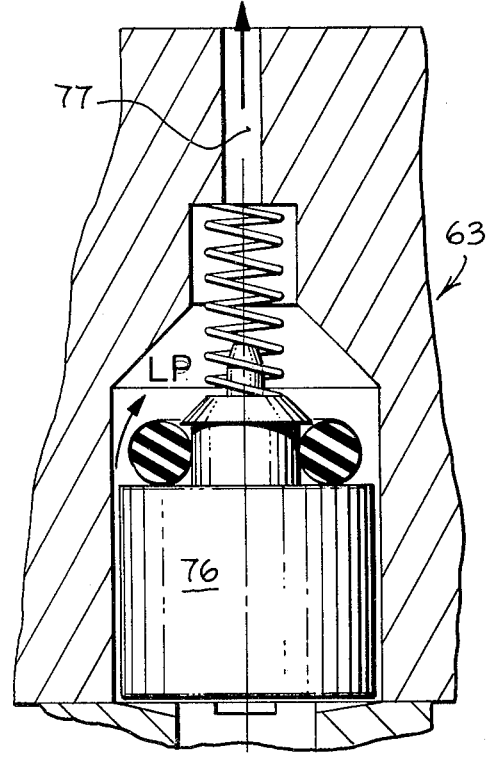
FIG_6

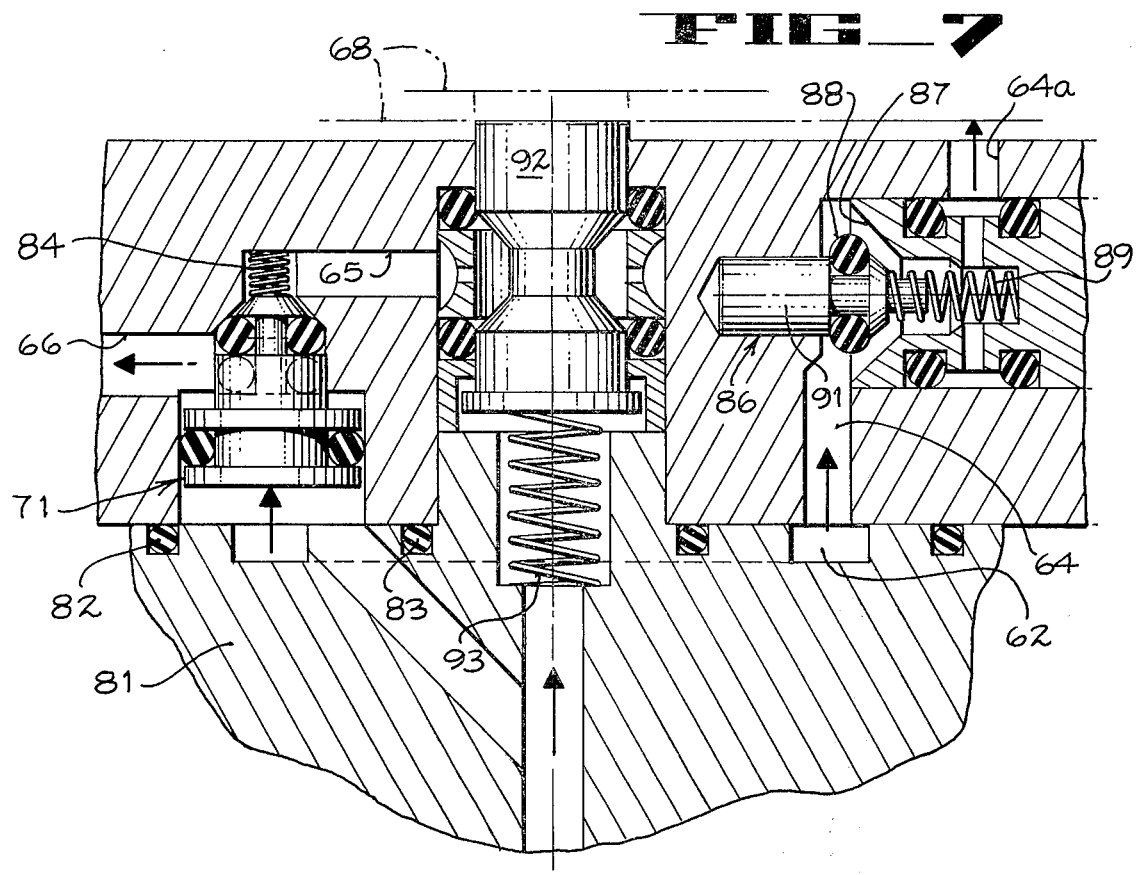
FIG_7
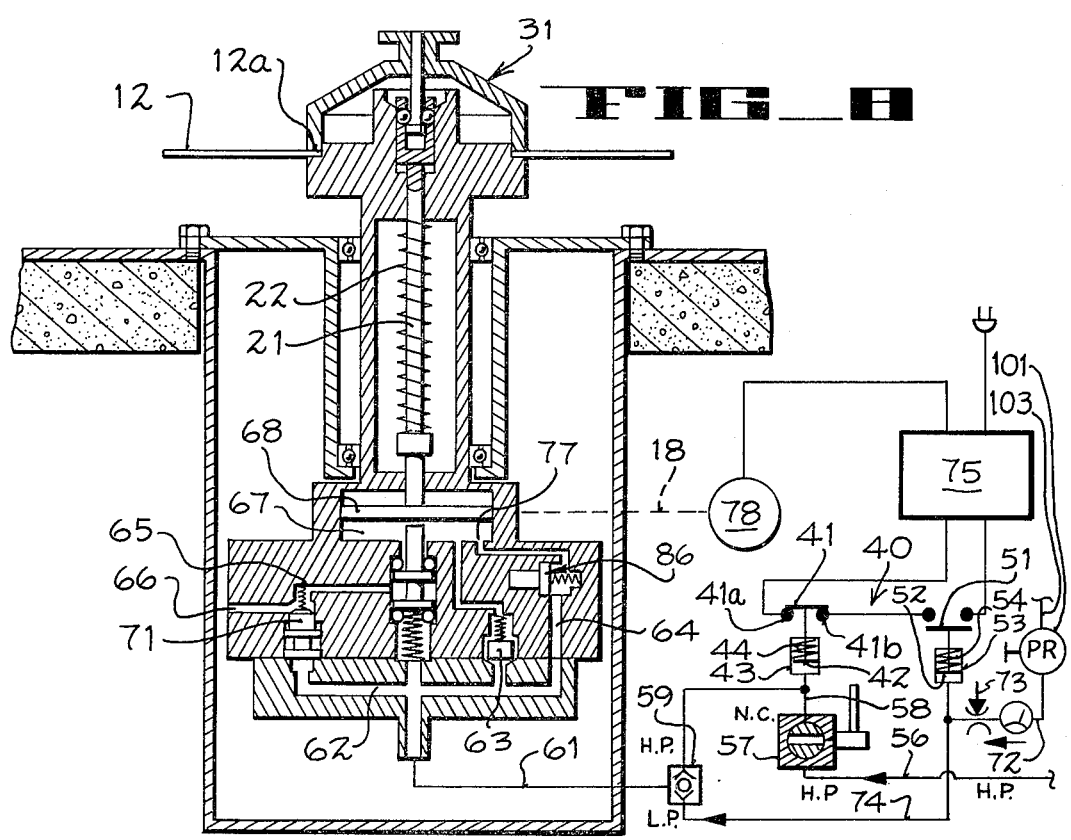
FIG_8

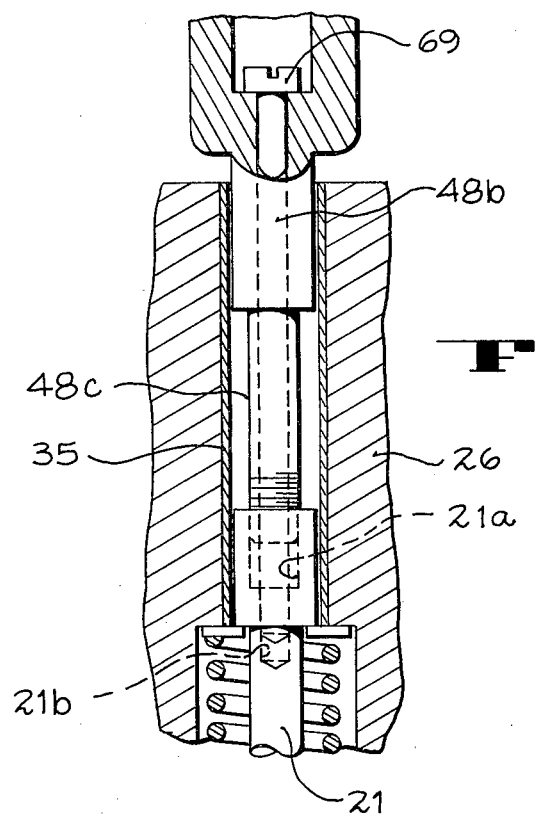
FIG_9
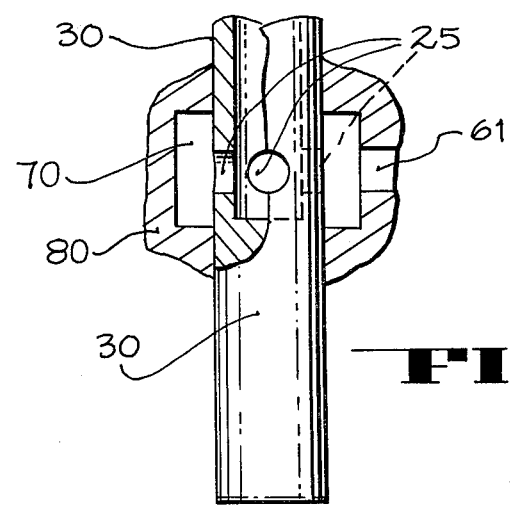
FIG_2A

SPINDLE ASSEMBLY

This invention pertains to a spindle assembly of a type for mounting discs thereon, usually of a type useful in carrying information, in a position whereby the disc can be tested or processed. More particularly this invention pertains to such an assembly characterized by means serving to sense and indicate that a disc so mounted varies from a given standard thickness.

In the past certain problems have been experienced in operating such equipment when the thickness of the disc to be mounted varies from a given standard thickness. For example, the erroneous thickness may cause damage to both the disc to be tested or processed and equipment (other than the spindle assembly) used to test or process the disc. Further, metal particles from such damage can be injurious to the operator.

In some instances, the discs which will be positioned onto the assembly may be arranged in stacks with loosely placed flat spacer rings disposed between adjacent discs. Also, the stack of discs may include an occasional disc which has a thickness varying from the given standard.

Unnoticed by the operator, a disc taken from such a stack can carry along one of the spacer rings or be of an erroneous thickness thereby introducing the problems noted above.

Thus, there has been a continuing need for an improved spindle assembly for holding discs and for immediately indicating discs thereon having a thickness which varies from a given predetermined standard thickness (hereinafter "a non-standard thickness").

In general, as disclosed herein, a spindle assembly of a type adapted to receive a readily removable disc to be mounted thereon for rotation with said spindle assembly includes means for sensing the thickness of the disc with respect to a predetermined thickness, and means responsive to the last named means for indicating whether the thickness of the disc varies from such predetermined thickness.

The spindle assembly includes additional features. One such feature, in general, serves to insure that the clamping body moves into and out of engagement with the disc surface substantially normal to the disc surface and under control of a portion of the assembly to avoid operator damage to the disc solely under control of a portion of the assembly.

Another such feature comprises means for varying the force with which the clamping body acts against the disc whereby smaller discs will not be clamped with the same force as larger discs.

In general it is an object of this invention to provide a spindle assembly for mounting discs thereon in a manner insuring the proper thickness of the disc before permitting rotation thereof.

It is another object of this invention to preclude release of the disc during rotation thereof.

It is yet another object of the invention to provide a spindle assembly as described above in which the degree of clamping movement of a clamping body serves to operate a portion of a pneumatic control system to permit or preclude rotation of the disc.

The foregoing and other objects of the invention will become more readily evident from the following detailed description of a preferred embodiment when considered in conjunction with the drawings, in which:

FIG. 1 shows a perspective view partially broken away for clarity of a spindle assembly according to the invention;

FIG. 2 shows an elevation section view of a spindle assembly according to the invention;

FIG. 2A shows an enlarged detail of tube 30 of FIG. 2;

FIG. 3 shows a section view in plan taken along the line 3—3 of FIG. 2;

FIG. 4 shows an exploded, enlarged section view of a cap assembly portion of a spindle assembly as shown in FIG. 2;

FIG. 5 shows an enlarged elevation section view of a thickness sensing valve employed in the pneumatic pressure control system of FIGS. 7 and 8 as taken along the line 5—5 of FIG. 3;

FIG. 6 shows an enlarged elevation section view of a high pressure sensing valve in the pneumatic control system of FIG. 8 and taken along the line 6—6 of FIG. 3;

FIG. 7 shows an enlarged elevation section view of portions of the air control system of FIG. 8 taken along the line 7—7 of FIG. 3;

FIG. 8 shows a diagrammatic view of a spindle assembly and controls with valving taken along the line 8—8 of FIG. 3; and FIG. 9 shows an enlarged elevation section view of means for adjusting the length of connecting rod assembly 20.

In general, as shown in FIG. 1, a spindle assembly 10 mounted through a plate 11 includes a rotatable head assembly 15 and an inner rotating assembly 13 driven by the relatively flat high-speed belt 18 engaging a portion 16 of assembly 13.

Spindle assembly 10 includes a cylindrical rigid bearing housing 17 disposed through plate 11 and supported by a laterally extending flange 14 bolted to the edge margin surrounding the upper end opening of plate 11. Housing 17 serves to support suitable upper and lower bearing means, such as the ball bearings 23, 24.

The inner rotating assembly 13 comprises a hollow spindle 19 carried by the inner race of each of bearings 23, 24 and formed at its upper end with a transversely extending spindle head 26. Spindle head 26 includes a raised peripheral edge 26a forming a registration surface supporting a disc adapter unit 27 secured to spindle head 26 by means of elongate bolts 28.

A cylinder block 29 includes a cylinder 67 formed therein and a piston 68 movable within cylinder 67 between advanced and retracted positions for operating a connecting rod assembly 20 to draw a clamping body, such as cap assembly 31 into clamping relation with disc 12 or to release cap assembly 31.

A top closure assembly 32 is mounted across the top of cylinder 67 and comprises an annular body 33 held by studs 34 to cylinder block 29 and formed to extend axially inwardly of the upper end of cylinder block 29.

Accordingly, as belt 18 is driven in a given direction, cylinder block 29 will be rotated as well as the annular body 33 disposed therein. In order to rotate spindle 19, a key 36, slidably disposed in a key way 36a serves to couple body 33 to spindle 19. A retaining ring 37 threadedly engaged onto the lower end of spindle 19 serves as a keeper to retain key 36 in its engaged position between body 33 and spindle 19.

The bottom portion of cylinder block 29 includes a number of air passages and valves, including manifold 62, and valves 71, 86 and 92 as described further below (see FIG. 7). Block 29 further includes a rigid tube member 30 (closed off at its lower end) extending axially downwardly therefrom through a gland block 81 and a stationary bearing block 80. Bearing block 80 includes upper and lower bearings 85 which permit tube member 30 to rotate within block 80.

Bearing block 80 includes a manifold 70 for receiving either high or low pressure air (or other fluid) from air supply line 61 for passing the air upwardly along the hollow channel within tube 30 via flow passages 25 (FIG. 2A).

The lower end portion of tube member 30 extends downwardly sufficiently to function as a drive connection for rotating the spindle assembly by coupling a motor shaft 95 directly thereto. Thus, a coupling body 90 using set screws to engage tube member 30 and motor shaft 95 can provide a direct drive from a motor 78'. It is to be understood that whenever motor 78' is to be used for rotating spindle assembly 10, it will be necessary to decouple the belt drive since one or the other may be used alone.

The clamping body or cap assembly 31, shown best in FIG. 4, serves to cooperate with means located at the upper end of spindle 19 for engaging cap assembly 31 to draw it downwardly against the inner edge margin 12a of disc 12.

Cap assembly 31 includes the circular dish-shaped body 46 formed at its peripheral edge margin with a downwardly directed clamping lip 47 formed with a flat bottom surface therearound lying in a common plane. The upper peripheral edge margin of disc adapter unit 27 includes a portion, such as the annular shoulder 27a upon which an annular disc 12 can be seated. Thus, when cap assembly 31 is properly disposed, means are provided for drawing cap assembly 31 downwardly whereby lip 47 serves to clamp the inner edge margin 12a of disc 12 between the bottom of lip 47 and the top of shoulder 27a.

Thus, cap assembly 31 includes a knob 38 having a hollow interior and a catch pin 39 extending downwardly within knob 38. Means herein serve to engage catch pin 39 and draw it downwardly under the force of spring 22 disposed about connecting rod 21. Means are further provided as hereinafter described for detecting the thickness of edge margin 12a as compared to a predetermined thickness so as to identify the mounting of a disc having a proper thickness. In the event that the disc is either too thick or too thin, means are provided for indicating this fact, preferably by inhibiting the motor drive from rotating the disc as explained further below.

Means for engaging catch pin 39 and for pulling downwardly on cap assembly 31 includes a ball sleeve 48 having a generally cylindrical upper portion. The upper end of ball sleeve 48 includes a plurality of laterally extending openings 49, each carrying a laterally movable steel ball 50. A cylindrical ball closing sleeve 55 includes an exterior flange 55a at its lower end secured tightly to and coaxially of disc adapter body 27 to permit ball sleeve 48 to move axially of sleeve 55.

The bore 55b of sleeve 55 widens at its upper end in order to permit balls 50 to retreat away from the axis of rotation to release their grip upon catch pin 39 or to permit insertion of pin 39 as now to be described with respect to FIGS. 2 and 4.

Ball sleeve 48 moves between lowered and raised positions sufficiently upwardly to permit balls 50 to be carried to a point where they can retreat away from bore 48a. Thus, when sleeve 48 moves to its raised position, catch pin 39 can be inserted into or removed from bore 48a. Catch pin 39 includes a lower retaining lip 39a disposed immediately below a shank portion 39b having a somewhat reduced diameter. Accordingly, by permitting balls 50 to retreat, retaining lip 39a can pass downwardly into (or upwardly out of) bore 48a so that subsequent downward movement of ball sleeve 48 will cause the reduced diameter of ball closing sleeve 55 to urge balls 50 laterally inwardly of catch pin 39 at a position located above lip 39a. As thus arranged, downward movement of connecting rod 21 captures pin 39 and pulls cap assembly 31 downwardly with it so that clamping lip 47 can engage the edge margin 12a of disc 12.

Thus, ball sleeve 48 is directly coupled to connecting rod 21. Means for urging connecting rod 21 and ball sleeve 48 downwardly includes compression spring 22 disposed about rod 21. Spring 22 engages a washer at its upper end and a boss 79 on rod 22 at its lower end. In this way, cap assembly 31 remains tightly clamped against disc 12.

Means for releasing the foregoing clamping action includes piston 68 which, when energized by high-pressure air (or other high pressure fluid), serves to move piston 68 upwardly in cylinder 67 so as to drive connecting rod 21 and ball sleeve 48 upwardly to a position whereby balls 50 are permitted to move radially outwardly into the widened upper end of ball closing sleeve 55. Once balls 50 have been so moved, catch pin 39 can readily be moved upwardly and out of bore 48a of ball sleeve 48.

Balls 50 are disposed axially along sleeve 48 at a position whereby they will still be retained laterally by the side wall of ball closing sleeve 55 when the upper end of sleeve 48 strikes the underside 38a of knob 38 and during a period thereafter sufficient to lift assembly 31 (and lip 47) clear of the disc surface.

Accordingly, when cap assembly 31 is to be placed onto spindle assembly 10 to retain a disc thereon, the upper end of sleeve 48 will prevent contact between lip 47 and the disc until sleeve 48 can be drawn sufficiently downwardly. In this manner the end of sleeve 48 inhibits the mannual seating of the clamping assembly by introducing an obstruction to manual movement of cap assembly 31 into engagement with the disc.

Thus, the clamping (and un-clamping) of the disc will be required to be substantially normal to the disc surface, thereby moving the cap assembly 31 between spaced and clamped positions with respect to the disc surface under machine control to avoid operator damage in clamping and un-clamping a disc.

The stationary gland block 81 includes an annular seal 82 serving to isolate manifold 62 (as shown in FIGS. 2 and 3).

FIGS. 5, 6 and 7 show, in enlarged detail, elements of an air pressure control system shown best in diagrammatic form in FIG. 8, and which can best be understood if it is first assumed that disc 12 is of the proper thickness.

Connecting rod 21, as noted, moves between advanced and retracted positions to operate ball sleeve 48. Thus, a sleeve guide or bushing 35 (FIG. 9) slidably receives the stem portion 48b of ball sleeve 48 as well as the upper end of connecting rod 21.

As explained further below means are provided for sensing whether the thickness of disc 12 corresponds to a given standard. This is determined by the degree of displacement of connecting rod 21 required for rod 21 and its associated spring 22 to draw cap assembly 31 firmly against disc 12.

Should the "standard thickness" need to be changed to a new standard, means have been provided, as now to be described, for changing the length of rod 21 and hence for changing the displacement defined by the thickness of edge margin 12a corresponding to the new standard.

Means for adjustably coupling stem portion 48b to rod 21 comprises the elongate threaded pin 48c threaded into the threaded hole 21a axially counter-bored into the upper end of rod 21. A locking screw 69 passes axially downwardly through stem 48b, pin 48c, hole 21a to engage the threads within a short counter-bored hole 21b extending further downwardly into rod 21.

Thus, in order to adjust the degree of downward displacement of cap assembly 31 to sense a new standard thickness of disc 12, locking screw 69 is released to permit ball sleeve 48 (and stem 48b) to be rotated to threadedly adjust into or out of hole 21a. Once the proper positioning (spacing) is established, screw 69 serves to tighten the threads of pin 48c against the threads within hole 21a so as to inhibit rotation therebetween.

In this way means have been provided for varying the length of rod 21 while permitting the rod to move slidably within bushing 35. At the same time no adjustment in the air pressure control system will be necessary.

When a disc 12 of proper thickness has been mounted upon spindle assembly 10, the disc and spindle will be rotated together under the drive of motor 78, as now to be described.

A motor activating circuit 40 includes switch armatures 41 and 51 respectively operated by an associated piston 42, 52 each movable between advanced and retracted position within an associated cylinder 43, 53. Each piston 42, 52 is yieldingly urged by springs 44, 54 downwardly (as shown). The relative location of armature 41 with respect to switch points 41a, 41b causes it to be moved to a normally closed state whereas armature 51 will be disposed to move to a normally open state.

Before mounting a disc to assembly 10 high pressure air from line 56 is connected to the system to move ball sleeve 48 upwardly to release balls 50 whereby catch pin 39 can be released to permit cap assembly 31 to be removed for placement of a disc 12. Thereafter cap assembly 31 can be remounted. High pressure air supplied via line 56 and valve 57 to line 58, moves armature 41 upwardly overcoming spring 44 to open motor control circuit 40. The high pressure also passes via a double acting check valve 59 to line 61 and into manifold 62 where valve 63 closes under high pressure (as shown in FIG. 6). Valve 71 also closes under high pressure to block the pressure relief channel 65, 66. The high pressure channel 64 discharges high pressure fluid (such as air) into cylinder 67 to act upon and lift piston 68 (and ball sleeve 48).

Thus, piston 68 operates connecting rod 21 to move between lowered and raised positions to lock and unlock cap assembly 31. The upward movement of rod 21 as noted above serves to unlock cap assembly 31 from ball sleeve 48 to permit a disc to be mounted and assembly 31 to be locked onto it, or to unlock cap assembly 31 to permit it to be removed whereby the disc 12 can be replaced by another or simply removed. During this procedure, it is to be noted, the rotation of the spindle is precluded due to the open switch 41.

Upon loss or release of high pressure, piston 68 moves downwardly under the force of spring 22 so as to draw cap assembly 31 downwardly to clamp and hold the inner edge margin 12a of disc 12. After cap assembly 31 has engaged disc 12, the pressure in the remainder of the system can drop whereby switch armature 41 closes under spring force across its associated switch points 41a, 41b to complete that portion of motor control circuit 40.

Absent the high pressure, a double acting check valve 59 shifts to close the high pressure side of valve 59 and to open the low pressure side as low pressure air (or other fluid) is fed to it via a circuit traced from air supply line 103 to an adjustable pressure regulator 101, to output line 72, needle valve 73, and line 74. The low pressure of line 74 supplies cylinder 67 both via channel 64 and high pressure sensing valve 63. Low pressure air bleeds past the closure body 76 of valve 63 to pass via low pressure channel 77 into cylinder 67.

Meanwhile, the low pressure build-up behind piston 52 serves to overcome the opposing spring force so that armature 51 completes its portion of motor circuit 40 thereby energizing motor 78 after a limited delay. A suitable control panel 75 permits motor 78 to be operated to carry out various operations for testing or processing a disc, or otherwise.

Energizing of motor 78 serves to drive belt 18 for rotating disc 12. As noted above, motor 78 can be relocated to be identified as motor 78' directly coupled to drive spindle assembly 10 (FIG. 2).

Inasmuch as the high pressure supplied via channel 64 is required to unlock cap assembly 31, it is necessary to preclude this possibility during rotation of disc 12. Thus, a centrifugally operated closure valve assembly 86 serves to close channel 64 (previously used to supply cylinder 67 for lifting rod 21). Whereas, before commencing rotation of spindle assembly 10, high pressure can be passed via channel 64, valve 86 (passing between the valve seat 87 and valve seal 88) and upwardly into cylinder 67 via channel portion 64a. A spring 89 urges seal 88 toward a retracted "open" position.

During rotation, centrifugal force acts upon closure body 91 to overcome the force of spring 89 to urge seal 88 against seat 87, thereby preventing any high pressure reaching cylinder 67 during operation of the machine.

In the event that the disc is thicker or thinner than the given standard the system senses this error and precludes operation of spindle assembly 10 as now to be described.

As shown in FIG. 2, if the disc which is placed upon assembly 10 is thicker than it should be, piston 68 cannot move down as far as a thinner disc would permit and, therefore, piston 68 will be held above a position where a disc having the proper predetermined thickness would permit it to reach. If disc 12 is too thin, piston 68 will be permitted to drop further into cylinder 67 than it should.

Sensing means as herein described serves to inhibit rotation of assembly 10 in the event that a disc of improper thickness has been mounted onto spindle assembly 10. Thus, as shown in FIGS. 5 and 7, a spool valve 92, disposed to be contacted by the bottom of piston 68 precludes rotation of assembly 10 in the event that a disc of improper thickness has been mounted onto spindle assembly 10. Thus, as shown in FIGS. 5 and 7, a spool valve 92, disposed to be contacted by the bottom of piston 68 precludes rotation of assembly 10 if disc 12 has an improper thickness. Means for sensing improper disc thickness prevents operation of motor 78 (or 78' when used) by preventing the build-up of low pressure within switch cylinder 53 to inhibit closure of switch armature 51 in response to back pressure in the system, as explained above.

Accordingly, as shown in FIGS. 5 and 7, spool 92 serves to release low pressure air (or other fluid) whenever disc 12 is too thin or too thick. The thickness of the disc determines the degree to which piston 68 will move spool 92. With a disc which is too thick mounted on shoulder 27a, spring 93 will move spool 92 too far upwardly, for example, to the phantom line position 94 before engaging piston 68. This displacement provides an escape path shown by arrow 96 between spool 92 and seal 97. The low pressure air escapes along the pressure relief channel 65, through valve 71 (which is normally open under the force of spring 84) and outwardly to ambient air via channel 66 whereby armature 51 cannot be closed by low pressure acting on piston 52.

Should disc 12 be too thin, spool 92 will be forced too far downwardly, for example, to phantom line position 98 so as to provide a low pressure relief path traced by arrow 99 between spool 92 and seal 104 to discharge via channels 65, 66 and the open valve 71. Seals 97, 101 are spaced apart by means of the annular spacer 102 disposed about spool 92.

It is to be observed that high pressure will not similarly be vented by movement of spool 92 since high pressure supplied to the system closes valve 71 to block pressure relief channel 65. Accordingly, high pressure can only serve to unlock cap assembly 31 and de-energize motor 78 (by opening switch armature 41 of the motor circuit) while low pressure serves to operate switch armature 51 to energize motor 78 to rotate disc 12. Low pressure also vents to atmosphere via valve 92 whenever the disc thickness is improper whereby back pressure to operate piston 52 cannot build up sufficiently to overcome spring 54.

Finally, by increasing the pressure in the low pressure output from pressure regulator 101, a "pre-load" can be applied to piston 68 and against spring 22 to reduce the clamping force acting against a given disc. It has been observed that the smaller discs should not be subjected to the same degree of clamping force as larger discs. Hence, by modulating the spring force available for clamping, this modulation of the clamping force can be achieved.

I claim:

1. In a spindle assembly of a type adapted to receive and support a disc to rotate with the spindle assembly, said spindle assembly comprising means for clamping and releasing a disc to said spindle assembly for rotation with said spindle assembly when clamped thereto, operating means movable between extended and retracted positions for operating the last named means, the thickness of a disc so clamped serving to define the degree of retraction of said operating means, drive means for rotating said spindle assembly, a fluid operated control system for activating and deactivating said drive means, said control system including a control valve operated in response to the degree of retraction of said operating means and serving to inhibit said drive means to preclude rotation of said spindle assembly whenever the degree of retraction lacks correspondence to a predetermined standard.

2. In a spindle assembly according to claim 1 further comprising means for adjusting said standard degree of retraction to permit discs of a different standard to be rotated with said spindle assembly.

3. In a spindle assembly according to claim 1 further comprising a centrifugally operated valve serving to preclude the application of high pressure to move said operating means during rotation of said spindle assembly to preclude release of said clamping means at such times.

4. In a spindle assembly of a type adapted to receive and support a disc to rotate with the spindle assembly, said spindle assembly comprising means for clamping and releasing a disc to said spindle assembly for rotation with said spindle assembly when clamped thereto, operating means movable between extended and retracted positions for operating the last named means, the thickness of a disc so clamped serving to define the degree of retraction of said operating means, a pneumatic circuit for moving said operating means toward said extended position and for controlling rotation of said spindle assembly, a control valve in said pneumatic circuit operated in response to the degree of retraction of said operating means, the movements of said valve serving to permit or preclude the rotation of said spindle assembly, said movements serving to preclude rotation of said spindle assembly whenever the degree of retraction lacks correspondence to a predetermined standard.

5. A spindle assembly of a type adapted to receive and support a disc to rotate with the assembly, said assembly comprising a rotatable head assembly including a support portion for supporting a record disc thereon, a cap assembly having portions movable into engagement with the disc to clamp the disc between said cap assembly and said support portion, means for engaging said cap assembly for moving same between extended and retracted positions for releasing or clamping a disc to said spindle assembly, means for detecting non-standard thickness of the disc, and means responsive to the last named means serving to preclude rotation of said head assembly.

6. In a spindle assembly according to claim 5 including means for selectively varying the clamping force applied to said cap assembly.

7. In a spindle assembly according to claim 6 comprising spring means disposed to apply a clamping force to said cap assembly, and selectively adjustable means applying a selected counteracting force against said spring means to vary the clamping force thereof.

8. In a spindle assembly according to claim 5 including means for inhibiting manual seating of said cap assembly against the disc.

9. In a spindle assembly according to claim 5 further comprising means for engaging said cap assembly to move same substantially normal to the surface of the disc between spaced and clamped positions with respect to the disc.

10. In a spindle assembly of a type adapted to receive and carry a disc to rotate therewith, drive means for rotating said spindle assembly, means for sensing the thickness of the disc with respect to a predetermined thickness, and means responsive to the last named means serving to inhibit rotation of said spindle assembly whenever the disc thickness sensed varies from said predetermined thickness.

* * * * *